Feb. 26, 1935. O. LELLEP 1,992,705
APPARATUS FOR BURNING MATERIALS
Filed Nov. 3, 1932
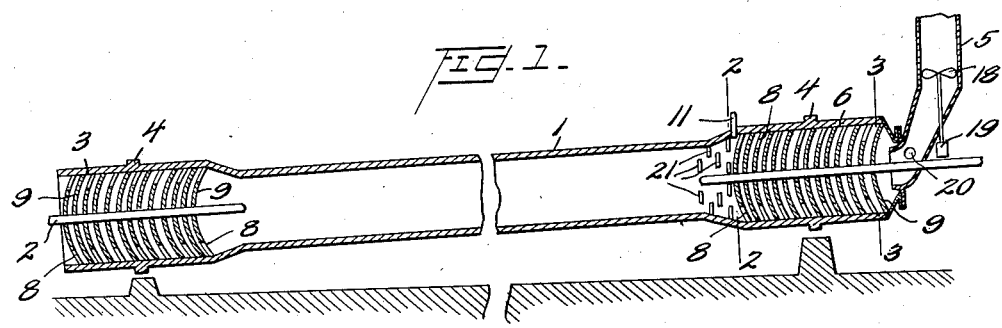
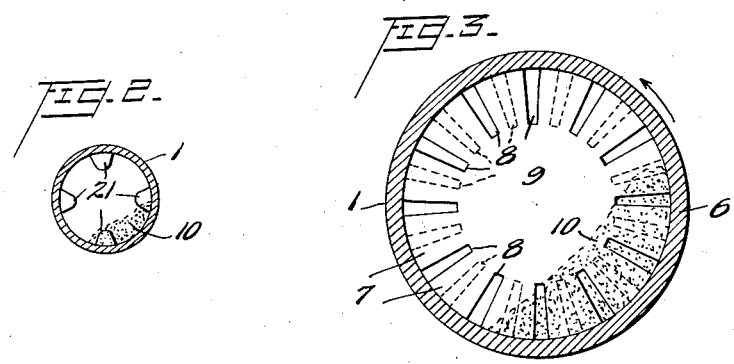
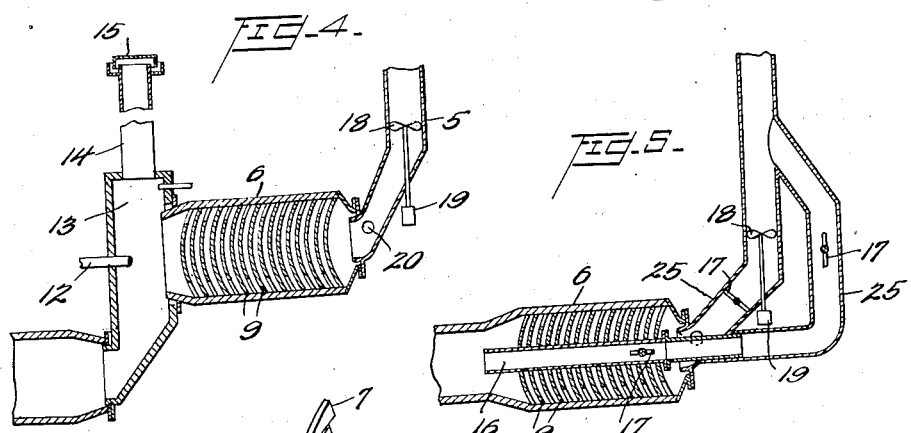
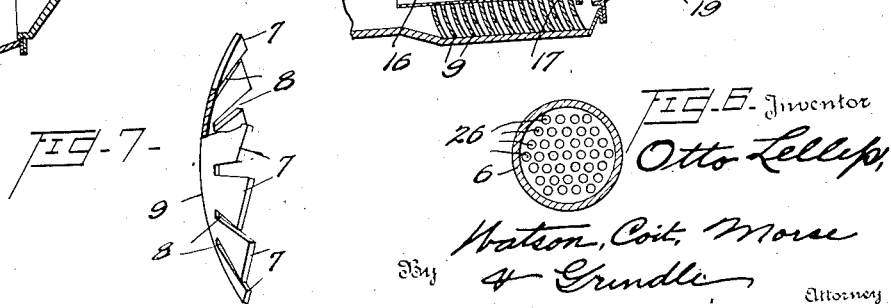

Patented Feb. 26, 1935

1,992,705

UNITED STATES PATENT OFFICE 1,992,705

APPARATUS FOR BURNING MATERIALS

Otto Lellep, Dusseldorf, Germany

Application November 3, 1932, Serial No. 641,052
In Germany November 4, 1931

4 Claims. (Cl. 222—7)

This invention relates to a process and apparatus for burning raw material and, more particularly, cement raw material. It is an object of the invention to improve the efficiency of rotary kilns, particularly with respect to the fuel consumption of the kiln.

In the calcination of cement raw material, for example, I have found that by effective preheating of the air which is introduced to support the combustion, the quantity of air required for the calcination of any given quantity of raw material may be materially reduced and the temperature of the exhaust gases discharged from the kiln may also be materially lowered. Thus if the usual rotary kiln is employed in which the air and burning gases flow through the kiln in a direction reverse to the direction of movement of the material, and the incoming air is preheated to a sufficient extent, the temperature of the exhaust gases is sufficiently low to permit the use of a highly efficient heat exchange device at the material inlet end of the kiln, so that the heat of the waste gas may be effectively transferred to the material prior to the actual burning of the latter.

It is therefore a feature of the present invention to provide a rotary kiln of the counter flow type having at its material outlet end a heat exchange device for transferring heat from the burned material to the incoming air, this device being so efficient as to effect transfer of at least 50% of the heat of the burned material, and having at its material inlet end a second heat exchange device of equally high efficiency for transferring the heat of the waste gases to the incoming raw material.

It is a more specific object of the invention to provide a rotary kiln having at both the inlet and outlet ends a heat exchange device comprising heat transfer elements which are rotatable with the kiln and so disposed as to contact alternately with the air or hot gas and with the material. Preferably these heat transfer elements assume the form of a series of plates extending transversely of the path of movement of material and gas, and carried by the kiln, these plates being apertured and so arranged that the apertures in successive plates are in staggered relation, whereby the gas is caused to follow a circuitous path in passing through the plates.

Further objects and features of the invention will be apparent from the following description taken in connection with the accompanying drawing, in which:

Figure 1 is a longitudinal sectional view of a kiln constructed in accordance with the principles of the invention;

Figure 2 is a transverse section on the line 2—2 of Figure 1;

Figure 3 is a transverse section on the line 3—3 of Figure 1;

Figures 4 and 5 are fragmentary longitudinal sectional views of the material inlet end of a kiln illustrating modified forms of the invention;

Figure 6 is a transverse sectional view of the material inlet end of the rotary kiln showing a further modification; and Figure 7 is a perspective view of one of the heat transfer elements employed in the form of the invention shown in Figure 1.

In order to facilitate understanding of the invention, specific language is used herein in describing the several embodiments thereof illustrated in the drawing. It will nevertheless be appreciated that no limitation of the scope of the invention is thereby intended and that various alterations and changes in the detailed construction may be effected without departing from the spirit of the invention.

Referring now to Figure 1 of the drawing it will be observed that the rotary kiln indicated at 1 is journalled on conventional rollers 4 and is provided at its material inlet and outlet ends respectively with enlarged chambers or drums 6 and 3 which communicate with the kiln proper and may form an integral part thereof, fuel being introduced into the kiln through a burner 2. The chambers 6 and 3 comprise heat exchange devices which are preferably constructed as illustrated in the drawing in which they are shown as similar, it being understood, however, that the similarity of the two devices is not an essential feature of the invention, although it is of major importance to employ heat exchange devices which are highly efficient at both ends of the kiln as hereinbefore indicated in order to obtain the advantages outlined.

Each of the chambers 6 and 3 is provided with a series of closely spaced plates or disc shaped elements 9, spacing of the plates being determined primarily by the nature of the material undergoing treatment. These plates are so supported that they rotate with the kiln 1 and with the associated chambers 6 and 3 and are provided adjacent the peripheral portions thereof with a plurality of openings 8 through which the material and the air or gas may pass, these openings being preferably in the form of radial slots extending inwardly. As shown in Figure 3 of the drawing, the successive plates are so arranged that the openings 8 are staggered with respect to each other which gives rise to whirling motion and turbulence of the gas as it passes through the chamber. The chamber 6 at the material inlet end of the kiln is preferably provided with a stationary exhaust stack 5, the material being introduced through an opening 20 communicating with this stack and discharging therefrom into the chamber 6. The position which the material 10 will assume as the kiln is rotated in the direction of the arrow is shown in Figure 3.

As the kiln rotates, the plates 9 are passed alternately through the gas or air and through the material, it being observed that this arrangement tends to prevent overheating of and resultant damage to the plates at the outlet end of the drum since the heat absorbed by these plates from the hot exhaust gases is promptly transferred to the material by movement of the plates through the latter.

The plates 9 are preferably formed of heat conducting material, for instance, sheet metal, and if necessary for strength, they may be dished as shown more particularly in Figure 7. Corrugated sheet metal may also be employed.

Preferably the tongue or blade portions 7 of the plates 9 intermediate the slots 8 are inclined so as to facilitate the movement of the raw material through the slots 8 toward the kiln proper.

In order to facilitate removal of the heat from the hot exhaust gases and to increase the temperatures of the raw material flowing into the kiln, that end of the chamber 6 adjacent the kiln proper may be so formed as to aid in the efficient transfer of heat from the kiln to the incoming raw material by radiation, for instance by the provision of projections 21 preferably of ceramic material and of any suitable shape formed on or carried by the interior of the wall of the chamber 6 as shown in Figure 2. This construction is primarily useful in preventing overheating of the plates 9 when the invention is applied to a relatively short kiln.

It is highly desirable to provide means for accurately controlling the temperature of exhaust gases to more properly regulate the action of the kiln on the material to be treated and to prevent overheating of the heat exchange device at the inlet end of the kiln. For this purpose a pyrometer 11 or other suitable instrument for ascertaining the temperature of the exhaust gas may be provided at that end of the chamber 6 which communicates with the kiln proper 1. In the arrangement shown in Figure 4 of the drawing the temperature may be regulated by the operation of a damper 15 located in a stack 14 communicating with the gas canal 13, the latter serving to receive the material discharged from the chamber 6 and to deliver the same to the rotating kiln, it being observed that with this arrangement, provision should be made to rotate the chamber 6 in order to effect movement of the material therethrough as heretofore explained. The temperature may be further controlled by introducing cooling water through a pipe 12 extending through the wall of the gas canal 13.

In the form of the invention shown in Figure 5 of the drawing, the chamber 6 is illustrated as formed integrally with the body of the kiln 1 and a conduit 16 extends through the central portion of the plates 8 and into the end of the kiln proper, this conduit being provided with a damper 17 which may be so controlled as to permit the withdrawal through the conduit of such quantity of hot gas as is necessary to provide the desired temperature. Dampers 17 are also provided in branch gas exhaust conduits 25, and the exhaust fan 18 driven by a motor 19 is located in one of these conduits past the associated damper 17, so that by manipulation of these dampers the rapidity of withdrawal of exhaust gas from the kiln may be accurately controlled.

In the form of the invention illustrated in Figure 6 of the drawing the heat exchange device is shown as comprising a plurality of tubes 10 extending longitudinally through the chamber 6, these tubes being spaced sufficiently closely to permit efficient exchange of heat between the exhaust gas and the material, the latter passing through tubes 26 and discharging therefrom into the kiln 1.

It will be observed that in the heat exchange devices shown in Figures 1 and 3 of the drawing, those portions of the plates 9 through which the hot exhaust gases flow are passed in their entirety through the material, only the stagnant relatively cooler gases adjacent the central portion of the chamber 6 contacting with those portions of the plates which are not passed through the material. This construction materially improves the efficiency of the device from the standpoint of heat exchange and minimizes the possibility of damage to the plates from overheating.

It has been heretofore proposed to untilize a heat exchange device at the inlet end of a rotary kiln for the purpose of preheating the material, but such devices have not been very efficiently constructed since they are required to withstand the excessive temperature ordinarily developed by the hot gas. By reason of the provision of an efficient heat exchange device at the discharge end of the rotary kiln, and the consequent reduction of temperature of the exhaust gas as the result of effective preheating of the air supply, I am enabled to utilize a heat exchange device at the inlet end of the kiln which is likewise highly efficient and which effects very material economies in the quantity of fuel required to burn a given quantity of raw material.

Having thus described the invention, what is claimed as new and desired to be secured by Letters Patent is:

1. A device for exchanging heat between a gaseous fluid and cement raw material and the like, which comprises a rotatable drum, and a plurality of axially spaced, transversely extending plates carried by and within said drum, said plates being provided with staggered apertures adjacent the peripheral portions thereof to permit passage of gaseous fluid and material therethrough.

2. A device for exchanging heat between a gaseous fluid and cement raw material and the like, which comprises a rotatable drum, and a plurality of axially spaced plates carried by and within said drum and extending continuously from one side of the drum to the other, said plates being apertured adjacent the peripheral portions thereof to permit passage of gaseous fluid and material therethrough, the apertures in adjacent plates being disposed in staggered relation.

3. A device for exchanging heat between a gaseous fluid and cement raw material and the like, which comprises a rotatable substantially cylindrical drum, a plurality of axially spaced substantially circular transversely disposed plates fitted within said drum and secured thereto, said plates being provided with radially extending slots adjacent the peripheral portions thereof to permit passage of gaseous fluid and material therethrough, the slots in adjacent plates being disposed in staggered relation.

4. A device for exchanging heat between a gaseous fluid and cement raw material and the like, which comprises a rotatable substantially cylindrical drum, a plurality of axially spaced substantially circular transversely disposed plates fitted within said drum and secured thereto, said plates being provided with radially extending slots adjacent the peripheral portions thereof to permit passage of gaseous fluid and material therethrough, the portions of the plates intermediate said slots being inclined in the same direction with respect to the general plane of the plates to assist the feeding of the material through the drum.

OTTO LELLEP.